United States Patent [19]

Mims

[11] 4,338,605

[45] Jul. 6, 1982

[54] ANTENNA ARRAY WITH ADAPTIVE SIDELOBE CANCELLATION

[75] Inventor: James H. Mims, Millersville, Md.

[73] Assignee: Westinghouse Electric Corp., Pittsburgh, Pa.

[21] Appl. No.: 125,809

[22] Filed: Feb. 28, 1980

[51] Int. Cl.[3] .............................................. H04B 7/00

[52] U.S. Cl. ....................... 343/100 LE; 343/100 SA; 343/854

[58] Field of Search .................. 343/100 LE, 100 SA, 343/854

[56] References Cited

U.S. PATENT DOCUMENTS

| | | | |
|---|---|---|---|
| 3,736,592 | 5/1973 | Coleman | 343/854 |
| 3,987,444 | 10/1976 | Masak et al. | 343/100 LE |
| 3,997,900 | 12/1976 | Chin et al. | 343/854 |
| 4,246,585 | 1/1981 | Mailloux | 343/854 |

*Primary Examiner*—S. C. Buczinski

*Attorney, Agent, or Firm*—H. W. Patterson

[57] ABSTRACT

A beam space adaptive array antenna system utilizing a two-stage Butler matrix configuration is disclosed. The individual elements of one subarray are input to the respective ports of a first-stage Butler matrix and the remaining summed subarray elements are input to a second-stage Butler matrix. The zero order output of the first stage Butler matrix is fed to the input of the second stage Butler matrix.

6 Claims, 12 Drawing Figures

ANTENNA ARRAY WITH ADAPTIVE SIDELOBE CANCELLATION

BACKGROUND OF THE INVENTION

1. Field of the Invention

The present invention relates to an antenna array; and more particularly to an improved beam space antenna array method and system that has certain fully adaptive properties with respect to the discrimination of interfering signals at all angular locations relative to such array.

2. Description of the Prior Art

Antenna arrays that are effective to minimize each of a plurality of undesired signals that correspond to the number of elements in the array at all angular locations relative to the field of view of such array, is referred to as a fully adaptive antenna array. The antenna elements of such arrays may be dipoles, slots, or other conventional elements depending on the desired application. In constructing such fully adaptive antenna arrays, an adaptive circuit which functions to pass a plane wave signal received in the main beam of the array and to discriminate against strong interference in a minor lobe, sometimes referred to as a sidelobe is connected to each individual element of the array.

Further, fully adaptive antenna arrays, may be configured as beam space systems wherein each of the antenna input feed ports responds to a signal source in a predetermined angular direction relative to the array. This is accomplished by utilizing a phase shifting device, preferably a Butler Matrix that has a plurality of input ports and output ports. Each of the output ports is coupled to a respective antenna element, and the phase shifting device generates an orthogonal set of beams, each responding to a particular input of the Butler Matrix. One of the beams is regarded as the main beam; and the other beams are adaptively weighted by a multiple sidelobe canceller to form a cancellation beam which is subtracted from the main beam. Each of the other beams that feed the multiple sidelobe canceller has a null in the direction of look of the main beam; and therefore, the output has a constant response to the direction of look of the main beam.

The beam space fully adaptive array is particularly advantageous in that it discriminates effectively against interfering noise sources in the near in side lobe regions, which is the region in the side lobes near the main beam of the antenna pattern as well as in the far side lobe regions, which are those regions farthest from the main beam of the antenna. Also, the beam space fully adaptive antenna array permits faster convergence in the weighting of signals as compared to the fully adaptive array that is not of the beam space type when using gradient search algorithms.

However, such fully adaptive arrays require extensive hardware in their implementation, in that an adaptive circuit is required for each of the individual antenna elements.

Thus, because of these hardware requirements, a fully adaptive array with a large number of individual antenna elements is expensive, and relatively impractical, particularly for airborne radar. For example, to construct a fully adaptive array of 100 individual antenna elements, it is necessary to process the signals from each of the 100 antenna elements for each of 100 angular locations.

In order to minimize the extensive hardware required for such fully adaptive antenna arrays, partially adaptive beam space systems are utilized wherein a small number of the total antenna elements are selected at random, with adaptive circuitry provided for each of the selected elements. Such antenna systems are capable of discriminating against only that number of signal sources that correspond to the selected antenna elements; and may not fully be effective for discriminating against an undesired signal emanating from all of the angular locations in the field of view of the antenna array. Such partially adaptive antenna arrays appear to function effectively for the purposes for which they were intended; but tend to be prone to space ambiguity of the signal, and except when constructed as a beam space system, tend toward slow convergence of the gradient search types of weighting solutions, and have a relatively low signal to noise ratio.

To amplify the preceding discussion, and form a more detailed understanding of the state-of-the-art as it relates to adaptive arrays, reference is made to the following publications by way of example:

In the IEEE Transaction on Antennas and Propagation, Vol. AP-24 No. 5 September 1976, the articles entitled:

(1) "Adaptive Arrays With Main Beam Constraints" commencing at Page 650;

(2) "Adaptive Arrays" commencing at Page 585;

(3) In the proceedings of the IEEE Vol. 55, No. 12 December 1963, an article entitled "Adaptive Antenna Systems" commencing at Page 2143;

(4) In IEEE Transaction on Aerospace and Electronic Systems, Vol. AES-14, No. 1, January 1978, on article entitled "An Improved Algorithm For Adaptive Processing" commencing at Page 172;

(5) In IEEE Transaction on Aerospace and Electronic Systems July 1971, on article entitled "Effect of Envelope Limiting In Adaptive Array Control Loops" commencing on Page 698;

(6) Proceedings of IEEE Vol. 63, No. 12, December 1975, an article "Adaptive Noise Cancelling: Principles and Applications" commencing at Page 1692.

Thus, in accordance with the foregoing, it is desirable to provide a beam space antenna system and method that discriminates against interfering signals at all angular locations in the antenna's field of view and is particularly effective in discriminating against interfering noise sources in the near in side lobe regions, without the extensive hardware requirements of a fully adaptive array.

SUMMARY OF THE INVENTION

In accordance with the system and method of the present invention, an array of antenna elements, is segregated into a plurality of subarrays, each constituting a selected number of the antenna elements of the array. Each element of at least one of the subarrays is connected to a respective one of the input ports of a first stage device, preferably a Butler matrix, that has a plurality of input and output ports and functions to provide the phase shifted sum of the signals at each of its input ports thereby providing an optimum signal at a particular output port that depends on the arrival angle of the received wave. With the exception of one, each of the respective output ports provides a signal that represents a progressive phase shifted sum of the input signals. One output provides a signal that represents a zero phase shifted sum of the input signals. The elements of each of the remaining subarrays are fed to a respective manifold that sums the signals collected by the individual elements of its respective subarray. A second stage device which is similar to the first stage device, has one input port coupled to the zero phase shifted sum signal, or main beam output of the first stage device and each of the remaining input ports coupled to one of the subarray manifold outputs. The remaining output ports of the first stage device along with all of the output ports of the second stage device are coupled to an adaptive control circuit to pass a plane wave signal received in the main beam of the antenna, and discriminate against interference in the side lobe regions of the main beam of the antenna aperture. The main beam output of the second stage device is the adaptive reference signal in the all digital configuration, and acts as the desired signal in the analog digital configuration.

The signals at the output ports of the first stage device are weighted by the adaptive algorithm to provide null steering most responsively in the far side lobe regions of the antenna array; and the output port signals with the exception of the main beam output of the second stage device as weighted by the adaptive algorithm provide null steering most responsively in the near-in side lobe region of the antenna array.

Such a system and method in accordance with the present invention provides full angle coverage with respect to the discrimination of undesired interference sources without spatial ambiguities; provides moderate subaperture gain in the near-in side lobe angular region of the main beam of the antenna array while at the same time requiring approximately $2\sqrt{N}$ adaptive control loops where N is the number of antenna elements rather than the N required for a fully adaptive antenna array, thereby substantially reducing the hardware requirements.

DESCRIPTION OF THE PREFERRED EMBODIMENT

Figure 1:
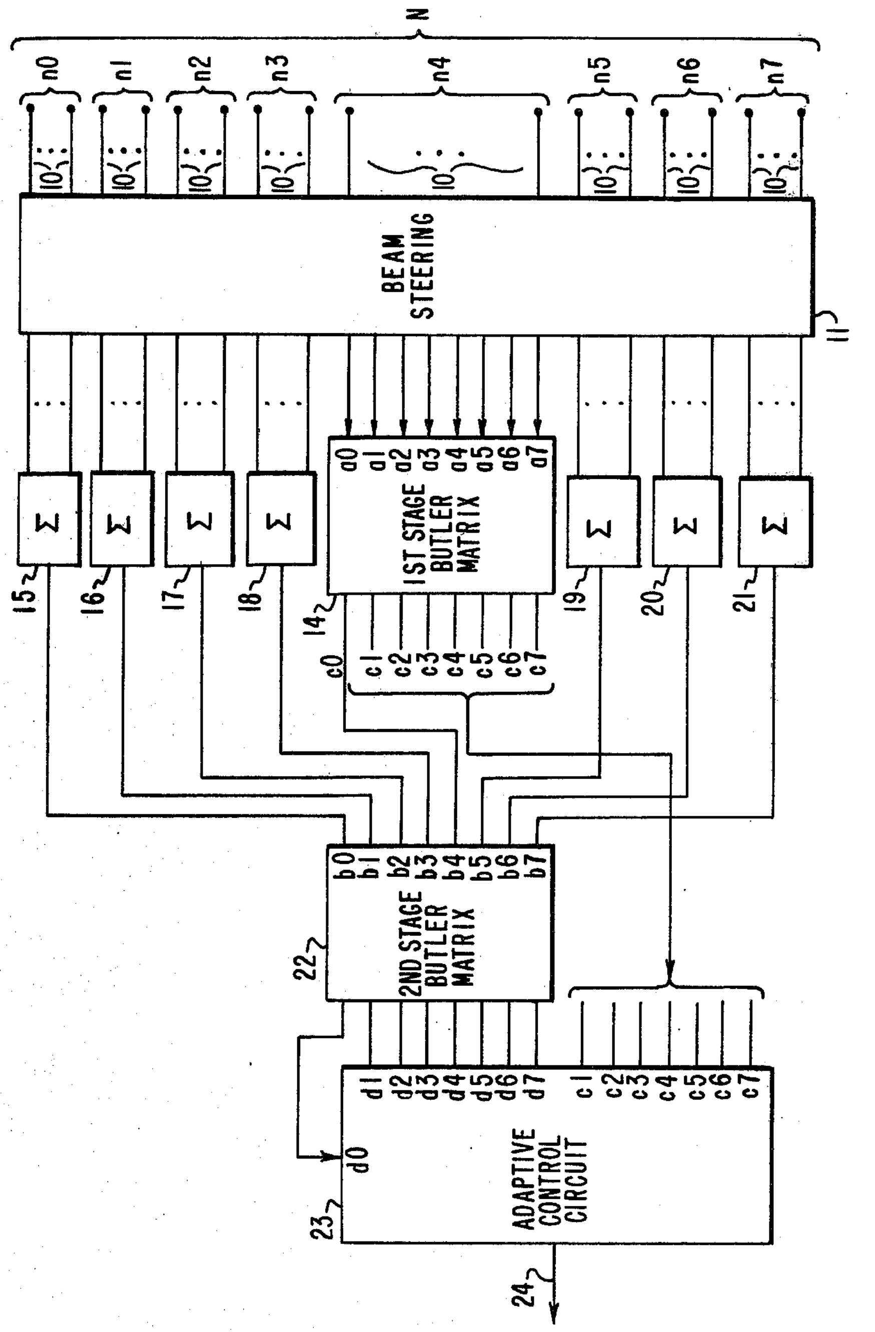
FIG. 1 is a block diagram of a beam space antenna array system in accordance with one embodiment of the present invention.

Referring to FIG. 1, a beam space array N is illustrated that includes a plurality of antenna elements each of which is referred to as 10. The individual antenna elements 10 are segregated into a plurality of subarrays each of which is referred to as n0 through n7 inclusive. For purposes of illustration, there are assumed to be 64 antenna elements in the array N and eight antenna elements 10 in each of the subarrays n0 through n7. The antenna elements 10 are further assumed to be approximately ½ wavelength apart or slightly larger to compensate for cross-coupling. Each of the individual antenna elements 10 is fed into a conventional well-known beam steering mechanism 11 so that the array N may be electronically scanned. Beam steering may be, of course, placed at other points in the system or may be eliminated for applications utilizing a fixed array. One of the subarrays such as n4, for example, has each of its eight outputs from the beam steering mechanism 11 coupled to a respective input port A0 through A7 of a first stage Butler matrix 14. The remaining elements of subarrays n0 through n3 and n5 through n7 are connected through the beam steering mechanism 11 to a respective one of the summing devices referred to at 15 through 21 inclusive to combine the signals from the individual elements 10 in its respective subarray.

The first stage Butler matrix 14 is a well-known device that is generally described in an article entitled "Beam Forming Matrix Simplifies Design of Electronically Scanned Antennas" by J. Butler and R. Lowe, published in ELECTRONIC DESIGN, Vol. 9, pgs. 170–173 on Apr. 12, 1961. Briefly, the Bulter matrix 14 constitutes a plurality of hybrid couplers and fixed phase shifters that have typically, but not necessarily a binary number of inputs. Each of the elements 10 of the subarray n4 are fed through the beam steering mechanism 11 to a respective one of such inputs a0 through a7, which in the present example is $2^3$. Processed in the first stage Butler matrix 14, the matrix distributes the input signal for each of the antenna elements 10 of the subarray n4 to all of its outputs referred to as c0 through c7 inclusive. The signal which appears on each of the outputs c0 through c7 represents a progressively linear phase shifted sum of the inputs. Thus, assuming that the output c0 represents a zero phase shifted sum of the input signals a0 through a7, then the output c1 may represent a 45° successively phase shifted sum of the input signals a0 through a7, for example. It follows, that the output c2 represents a 90° successively phase shifted sum and so forth until output c7 which represents a −45° successively phase shifted sum of the input signals. The Butler matrix 14 is capable of generating eight distinct beam positions in space from the antenna array N with each position equally spaced over the sin angle field of means of the array.

The outputs of the manifolds 15 through 21, each of which may be conventional corporate fed or travelling wave manifolds, for example, are referred to as b0 through b3, and b5 through b7, respectively. These outputs are fed to respective inputs of a second stage Butler matrix 22. In addition to the inputs b0 through b3 and b5 through b7 from the respective manifolds 15 through 21 being fed to respective input ports of the Butler matrix 22, an output c0 of the first stage Butler matrix, which is its zero order or main beam output, is also fed to an input port b4 of the matrix 22. The Butler matrix 22 is similar to the Butler matrix 14 heretofore described. The Butler matrix 22 has its output ports d0 through d7, inclusive, connected to the input of an adaptive control circuit 23. Also, the outputs c1 through c7 of the first stage Butler matrix 14 are connected to the adaptive control circuit 23. The adaptive control circuit 23 functions to weight the individual signals on the inputs d1 through d7 and c1 through c7 to provide the array response or output at 24. The output d0, which is the zero order output or main beam of the second stage matrix 22 is coupled to and utilized as the adaptive reference signal for the adaptive control circuits 23, when the circuit is all digital in nature.

Figure 2A:
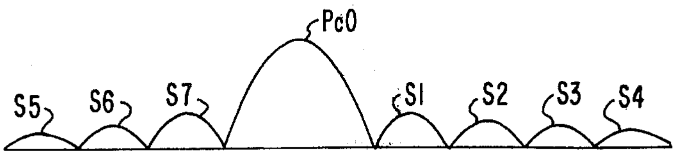
FIGS. 2A–2D illustrate the array and subarray patterns generated in accordance with the system and method of the present invention.

In describing the functional characteristics of the present invention, reference is made to the diagrams 2A through 2D wherein the individual patterns that correspond to respective outputs in the diagram of FIG. 1 bear similar reference characters except that they are prefixed with the letter P. Each of the manifolds 15 through 21, inclusive, and zero order output c0 of the first stage Butler matrix 14 functions to sum the signals of its associated subarray n0 through n7, and generates a pattern such as shown in FIG. 2A, that includes the main lobe Pc0 that typically has a gain of +10 dB, for example, and a plurality of side lobes referred to as S0 through S7, inclusive. Although it is preferred to utilize the zero output c0 for the summation of the elements 10 of the subarray n4, it is understood that the substitution of a manifold such as is provided for the remaining subarrays n0 through n3 and n5 through n7 may be substituted therefor, if desired. Also, other ones of the subarrays may be fed to the first stage Butler matrix instead of the center subarray n4 provided that the zero order output c0 of the Butler matrix 14 is connected to the corresponding input to the second stage Butler matrix 22. Each of the individual outputs c1 through c7, inclusive, of the Butler matrix 14 generates a pattern similar to that shown in FIG. 2A except that the angular direction of the main beam and side lobes progress linearly in sin angle space by a predetermined amount, such as one beamwidth, for example, from the direction of its adjacent output.

Figure 2B:
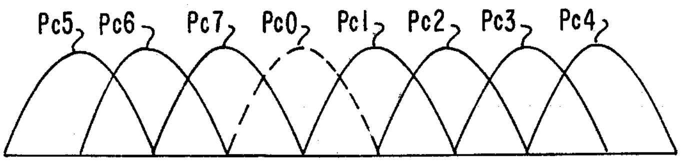
Figure 2C:
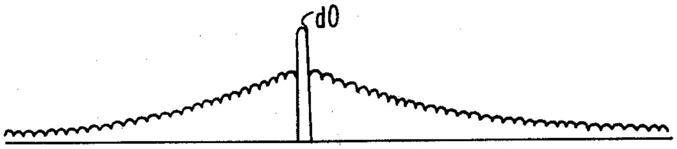
Figure 2D:
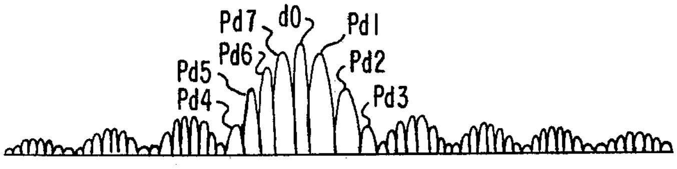

Referring to FIG. 2B, the beam of each output Pc0 through Pc7 of the first stage Butler matrix 14 is illustrated, wherein the beam Pc0 of FIG. 2A is shown in dashed lines in FIG. 2B and is eliminated from input to the adaptive control circuit 23. The main beams Pc1 through Pc7, inclusive, are equally spaced in the sine of the space angle as shown in FIG. 2B, and cover all of the sine space angles in space unambiguously as an orthogonal set. The zero order output Pc0 which is fed to port b4 of the second stage Butler matrix 22, generates a main beam response at zero order output d0 that represents a zero phase shifted sum of the signals appearing on all of the outputs b0 through b7 from the manifolds as well as the summation of the individual elements 10. Thus, the zero order output d0 of the second stage matrix 22 is the sum of all of the steered array elements 10 representing the main beam port of the antenna array wherein pattern Pd0 of FIG. 2C represents the main beam for such zero order output, or in other words, the straight ahead direction relative to the antenna array N. Each of the outputs d1 through d7, inclusive, provides a pattern similar to that shown for FIG. 2C except shifted in angle so as to cluster about the main beam as shown by Pd1 through Pd7 in FIG. 2D similar to the operation of the first stage Butler matrix 14. It is noted, that the outputs Pb0 through Pb3, Pc0, and Pb5 through Pb7 have a broader pattern for the main beam as shown in FIG. 2A than the main beam response Pd0 of FIG. 2C. The zero order output Pd0, represents the non-adapted main beam antenna aperture response, as previously mentioned. The other pattern Pd1 through Pd7 form a cluster of main beam responses which follow the main beam if steered, or fixed, that would ordinarily ambiguously repeat over each sine space angle equal to the spacing of the sub-beams at the output of the second stage Butler matrix 22. However, as shown in FIG. 2D, the subarray n4, which is referred to, as the control subarray, has a response that multiplies the spatial response. Thus, the beams Pd1 through Pd7 at the output of the second stage Butler matrix 22, fill the void left by the removal of the beam Pc0. The individual beams Pd1 through Pd7, as shown in FIG. 2D are adaptively weighted to control the response in the near-in side lobe region of the main beam Pd0 within the pattern of Pc0. The outputs c1 through c7 of the matrix 14 are adaptively adjusted to cover the far side lobe regions of the main beam pattern of the antenna aperture N.

The adaptive weighting of the outputs from the first stage Butler matrix 14 and the second stage Butler matrix 22 wherein the outputs d1 through d7 control the response in the near-in side lobe region provides performance near the main beam where the antenna side lobes are generally higher thereby to provide similar performance to that of a fully adaptive, beam space array. Further, where the outputs c1 through c7 of the first stage Butler matrix are adaptively weighted, provides performance in the far side lobes that exceed the performance of a thinned element adaptive array due to the subarray gain, and without the usual spatial ambiguities. This is accomplished by the adaptive weighting of only the outputs from the matrices 14 and 22 less the zero order output of each of such matrices.

It should be noted, that the output port c0 of the matrix 14 which is the main beam looking directly in the steered direction or directly ahead relative to an unsteered antenna aperture does not feed the adaptive control circuit. Instead, the output c0 feeds the second stage Butler matrix 22; and the zero order output of the second stage Butler matrix d0 feeds the adaptive control circuit 23 as the main beam response and as a reference channel if needed. The inputs to the second stage Butler matrix 22 have signals that are all looking in the steered direction. Although, the described embodiment illustrates a method and system wherein up to a maximum of 14 different interference sources located at all angular locations can be discriminated against, it is understood that the system may be modified to include additional sources by changing the size of the individual Butler matrices, the overall size of the antenna array n, or the number of elements 10 of each subarray n.

Figure 3:
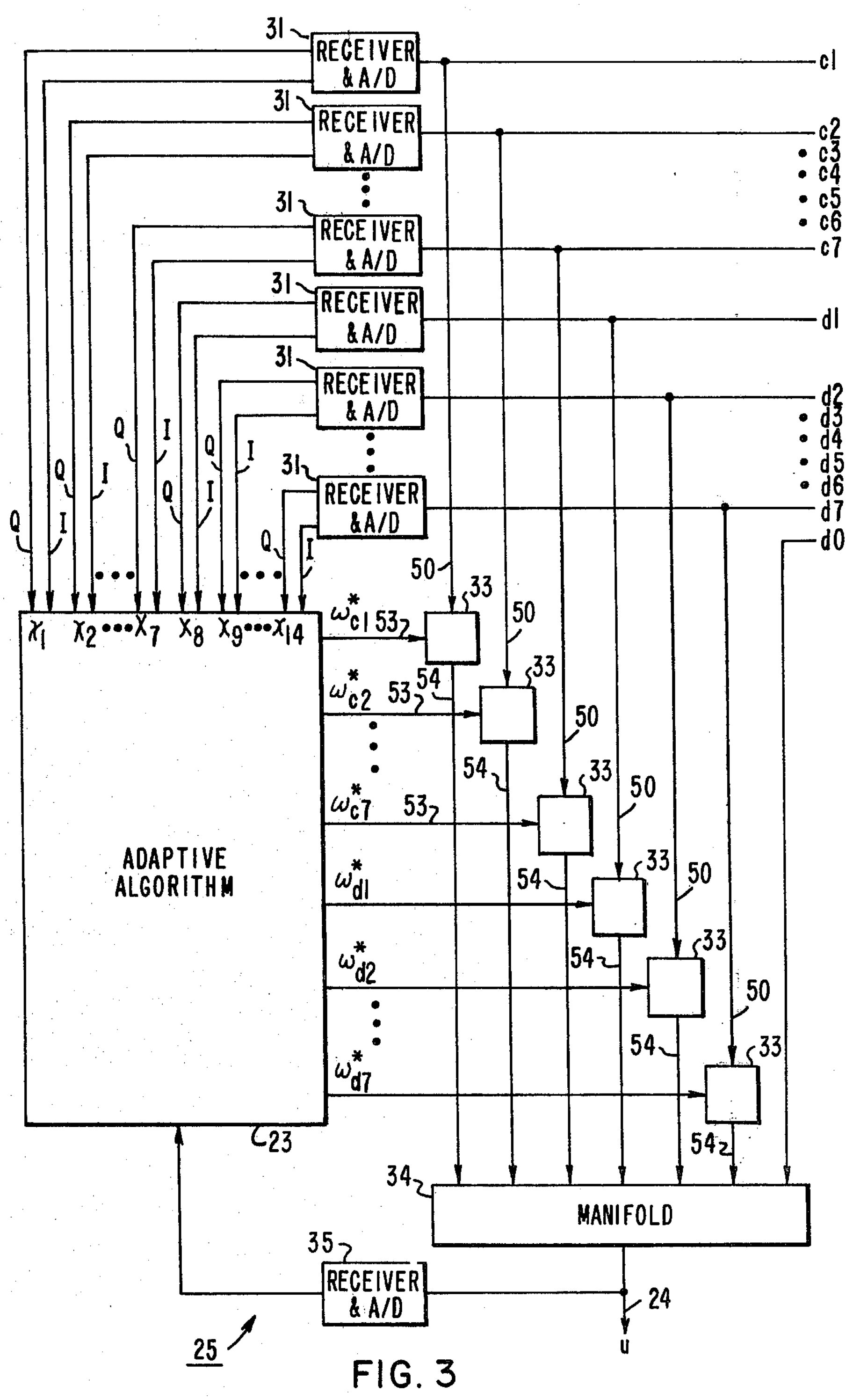
FIG. 3 is a block diagram of typical adaptive control circuits generally shown in FIG. 1.

Any number of well-known adaptive control circuits and concepts may be utilized in practicing the present invention. Such techniques are well known and described in various publications including "The Special Issue On Adaptive Arrays" IEEE Transactions on Antennas and Propagation published in September 1976 in Vol. AP-24 No. 15, of the present invention and in particular for the beam space adaption algorithm of the covariance type, see FIG. 3 of "Adaptive Arrays With Main Beam Constraints", on page 653 of said special issue on Adaptive Arrays. Although various types of algorithms for adaptive control circuits may be utilized in the practicing of the present invention, which are well known to those skilled in the art and form no part of the present invention, a brief description thereof will be presented in connection with FIGS. 3 through 8. Referring to FIG. 3, adaptive control circuitry 23 which may be utilized in the system and method of the present invention, includes the inputs c1 through c7 and d1 through d7 as previously described. Each of the inputs, d1 through d7 is fed to a respective analog-to-digital converter receiver, each of which is referred to at 31. Each of the receivers and converters 31 is in effect a synchronous detector that rids the signal of carrier components and converts the microwave signal to a digital signal for use in an adaptive algorithm represented generally by the block 23 which functions to compute the weights that are applied to each of the incoming signals. The weights which are calculated by the adaptive algorithm represented by the block 23 are output over lines referred to as wc1 through wc7, and wd1 through wd7, inclusive. These weights which are preferably digital in nature are each converted to analog form in devices which are referred to at 33. The devices 33 also change the phase and amplitude of its respective input in accordance with the weights from the adaptive algorithm which in effect shifts the null of the side lobes back and forth, depending upon the particular weights applied. The weighted signal from each of the devices 33 is fed to a manifold 34 which sums the signals appearing on c1 through c7 and d1 through d7 after being weighted by the devices 33. The unweighted input d0 from the Butler matrix 22 is also applied to the manifold 34 and summed with the weighted inputs previously described. To those skilled in the art, it is understood that transmission line lengths, receiver, and A/D circuits are to be matched in amplitude, phase and time delay among these connections to preserve the bandwidth integrity of the antenna and indeed as may be made of corporate fed manifold structures. The summed signal on 24 at the output of the manifold 34 is fed back through a receiver and A/D converter 35 which is similar to the devices 31 to the adaptive algorithm referred to at 23.

Figure 4:
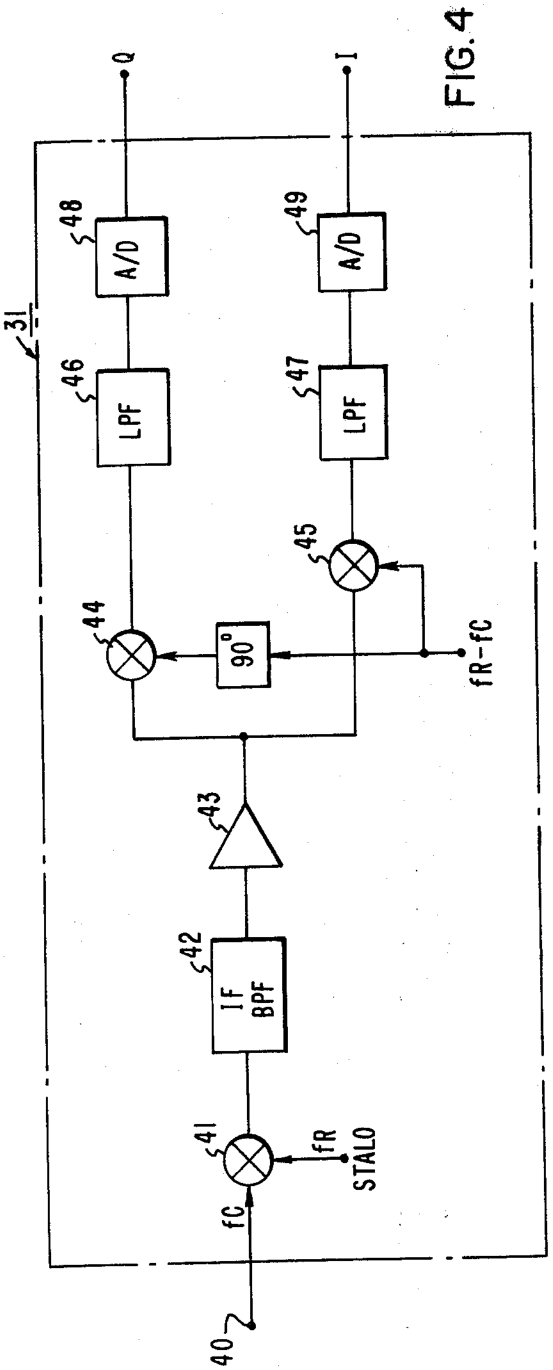
FIG. 4 is a block diagram to show in more detail the receiver and A/D converter of FIG. 3.
Figure 5:
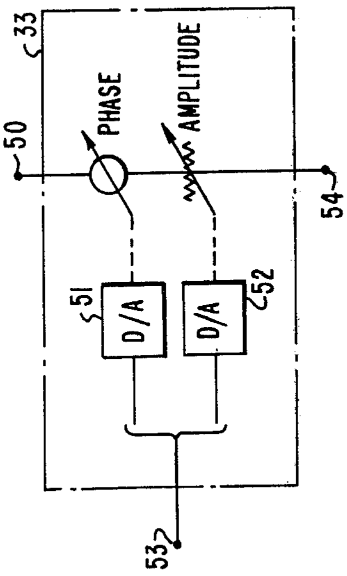
FIG. 5 is a block diagram to show in more detail the phase and amplitude digital-to-analog converter of FIG. 3.

Referring to FIG. 4, a typical receiver and analog-to-digital converter 31 is illustrated in more detail and conventionally includes an input 40 in which the carrier frequency is mixed with the stable local oscillator frequency at 41 which is then converted to an IF frequency through a bandpass filter 42 and amplified by an amplifier 43. The output of the amplifier is then applied to in-phase and quadrature mixers in a conventional manner at 44 and 45 with each resulting component being passed through a low pass filter 46 and 47, respectively. The analog output of each of the low pass filters is then converted to a corresponding digital representation of the in-phase and quadrature components by A/D converters 48 and 49, the outputs of which are applied to the adaptive algorithm 23. Referring to FIG. 5, each of the weighting devices 33 conventionally includes an input 50 to which is applied the signal from a respective one of the outputs from either the first stage or the second stage Butler matrix and digital to analog converters, 51 and 52 which convert a respective weight applied to its input 53 to analog form for weighting the signal on 50 to change its phase and/or amplitude to provide a weighted signal on output 54 for application to the manifold 34 of FIG. 3. The typical adaptive circuits heretofore described are well known and function to minimize an undesired signal.

Figure 6:
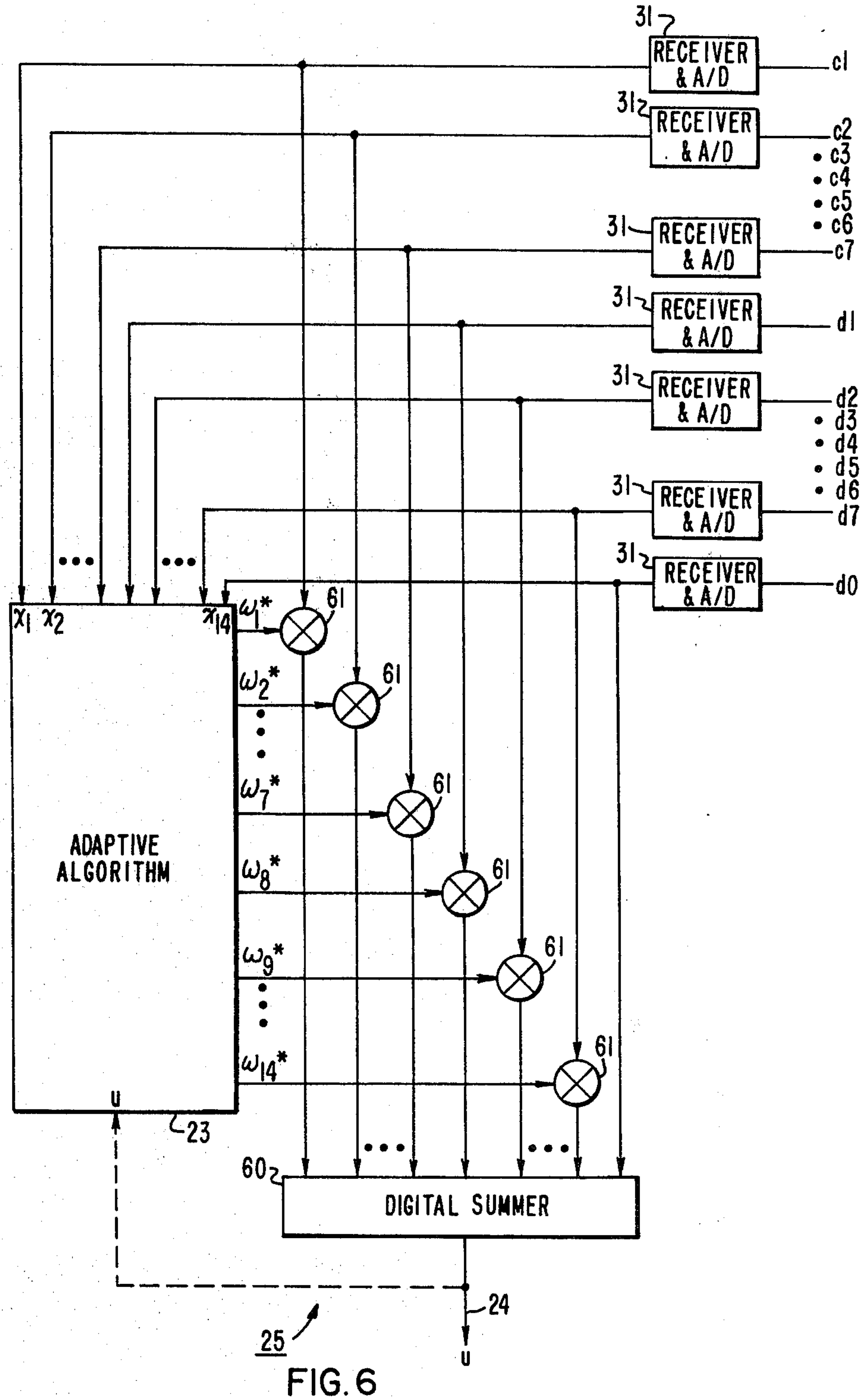
FIG. 6 is a block diagram of another form of adaptive control circuit generally shown in FIG. 1, which is all digital.

Referring to FIG. 6, an alternate embodiment of an adaptive control circuit may be used which is similar to FIG. 3, except that is all digital and includes a digital summer 60 to sum the weighted and reference signals instead of the manifold 34 of FIG. 3 and multipliers 61 for multiplying the digital inputs from the respective converters 31 by the calculated weights from the algorithm such as 23.

Figure 7:
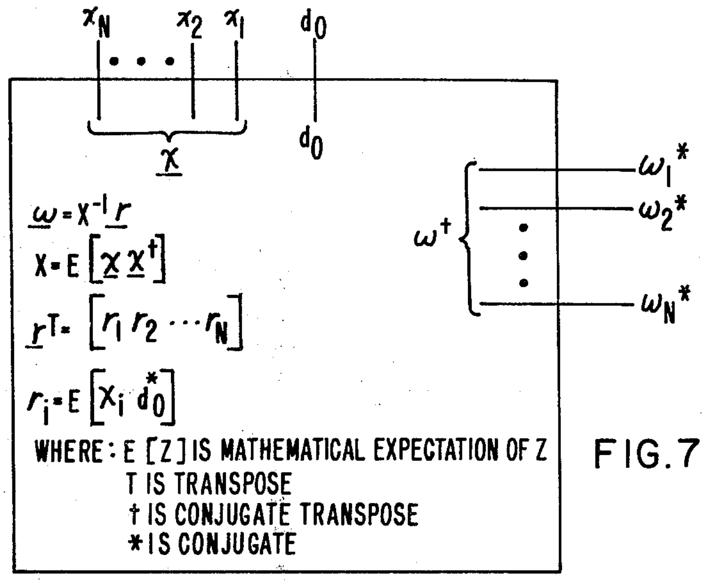
FIG. 7 illustrates an all digital convariance algorithm for use in the control circuits.

Examples of well-known adaptive control algorithms which may be utilized in the system and method of the present invention, are a direct solution by analog-to-digital conversion with a mathematical calculation of the weight set; least means squares algorithm by analog-to-digital conversion and digital calculation or least mean squares algorithm with analog control loops for adjustment of weights; or any other well known gradient search procedures. With reference to FIG. 7, an all digital covariance algorithm is outlined wherein $\underline{\omega}$ is the weighted signal, $X^{-1}$ is the inverse of the covariance matrix, $\underline{r}$ is the cross-correlation vector between signal vector $\underline{x}$ and main beam port d0, and X is an average of the outer product of the input vector $\underline{x}$. Although, the above-described type of algorithm is considered preferable, an LMS algorithm such as outlined in FIG. 8 may be desired wherein the inputs $x_n$ are fed through optional limiters 62 and multiplied by the error signal u multiplied by gain K at 65 through digital integrator 63 to produce the weights $\omega_1$ through $\omega_n$ with the output thereof multiplied at 61 by input signals to obtain the array response u.

$$\underline{\omega}_{n+1}=\underline{\omega}_n-2ku_n\underline{x}_n^*$$

where the error response $$u_n=d0+\underline{\omega}_n+\underline{x}_n$$

K is the gain factor usually $0<K<<1$ d0 is the main beam response or the "desired response".

The least mean squares algorithm is a gradient search procedure wherein the adaptive weights are slowly adjusted to provide the least mean square error response to the desired signal thereby reducing to the greatest extent possible the array response to jammers or other interferences in the sidelobe regions of the array pattern. The teachings of the LMS algorithm are numerous in literation and specifically given by Widrow et al. in "Adaptive Antenna Systems" Proceedings of IEEE, Vol. 55, No. 12, December 1967, Pages 2143–2159 and as particularized to interference cancellation by Reference 2 Kretschmer and Lewis, "An Improved Algorithm for Adaptive Processing", IEEE AES-14, No. 1, January 1978, Pages, 172–177 or by Reference 3 Widrow et al., "Adaptive Noise Cancelling", IEEE Transaction, Vol. 63, No. 12, December 1975, Pages 1692–1716. The equations are given below with symbols referring to FIGS. 1, 3, 6, and 8 herein.

$$\underline{x}^T \doteq [c1\ c2\ \ldots\ c7\ d1\ d2\ \ldots\ d7]=[x1\ x2\ \ldots\ x14]$$

$$\underline{\omega}^+ \doteq [\omega_{c1}{}^*\ \omega_{c2}{}^*\ \ldots\ \omega_{c7}{}^*\ \omega_{d1}{}^*\ \omega_{d2}{}^*\ \ldots\ \omega_{d7}{}^*]=[\omega_1{}^*\ \omega_2{}^*\ \ldots\ \omega_{14}{}^*]$$

$$u=d0+\underline{\omega}^+\underline{x}$$

where:

T is transpose

* is conjugation

+ is conjugate transpose

- denotes a reactor quantity

Figure 8:
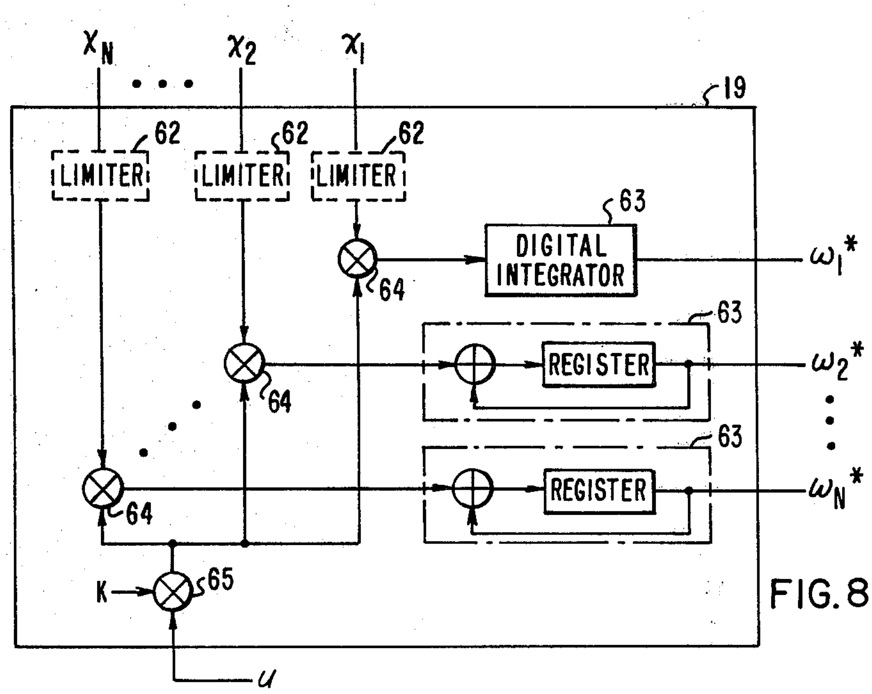
FIG. 8 illustrates an LMS algorithm for use in the control circuits.
Figure 9:
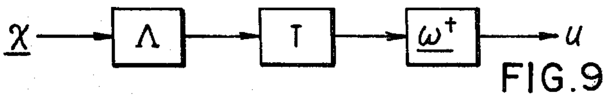
FIG. 9 is a diagram of an analytical matrix model of the adaptive array response.

The LMS algorithm shown in FIG. 8 as used with the hybrid analog/digital arrangement in FIG. 3 is represented mathematically as $$\underline{\omega}_{n+1}=\underline{\omega}_n+2ku_n\underline{x}_n^* \quad (1)$$

where:

$$u_n = d0_n + \underline{\omega}_n{}^{+}\underline{x}_n \quad (2)$$

$$K << \frac{1}{\sum_{i=1}^{14} E[|x_i|^2]} \quad (3)$$

E is the mathematical expectation. The above LMS algorithm equations (1) through (3) will be recognized in the above three references as follows:

$\underline{\omega}$ weight set $\underline{x}$ set of measurements u adaptive array output which is defined in the canceller application as the error d0 the main beam response or the "desired" signal k the LMS gain factor that determines convergence rate, stability, and steady state residual noise Note the difference of sign in equations (1) and (2) with respect to convention is necessitated by the microwave manifolding hardware. The digital integrator 63 in FIG. 8 is illustrated in an adaptive loop in FIG. 7 of Reference 1 page 2149.

The advisability of using a limiter, 62 in FIG. 8 is discussed by Brennan and Reed; "Effort of Envelope Limiting in Adaptive Control Loop", IEEE AES - July 1971, pages 698–700.

The direct (covariance) solution by analog-to-digital conversion with a mathematical calculation of the weights provides immediate sidelobe cancellation generally with only a single calculation of weights. The general solution shown in FIG. 7

$$\underline{\omega} = \underline{x}^{-1}r$$

follows the teaching of equation 5–8 on page 593 of reference (2).

Thus, there has been described herein a two-stage, beam space, adaptive array that provides full angle coverage without spatial ambiguities, moderate subaperture gain in the far side lobe region, and fully adaptive performance in the near side lobe region. In accordance with the present invention, approximately $2\sqrt{N}$ adaptive degrees of freedom; or in other words, $2\sqrt{N}$ control loops are utilized rather than the N required for a fully adaptive array. It is understood, that the present invention is applicable to fixed and electronic scannable arrays. Because of the gain inherent in the Butler matrices, first and second devices, such as the signal taps for the adaptive loops can generally be attenuated on the order of 20 dB or more, for example, depending on the side lobe levels. Thus, the use of the zero order outputs c0 and d0 from the two Butler matrices for the main beam is not required; but instead, may be manifolded in the usual manner with lightly coupled taps added to provide for the Butler matrix inputs. The arrangement heretofore described is also well-matched to the bandwidth constraints of the antenna design in that the output from the first stage Butler matrix 14 effectively cancels wide band signals near the main beam direction due to small time delay across the array N; whereas the subarrays n have distributed sampling over the full array for wide angle signals. Since the present invention utilizes only a moderate number of adaptive weights, the use of two or more time delay weight sets to compensate for bandwidth if needed is much more affordable than in a fully adaptive array.

Once having the benefits of the teachings of the present invention, it will occur to anyone skilled in the art that the system and method may be extended to a multiplicity of Butler matrices stages rather than the two stages described herein wherein the number of control elements or inputs to the adaptive circuitry are further reduced. For example, when the array N has 256 elements in a configuration utilizing the two-stage Butler matrix as described herein there would be 30 control elements. However, if the number of Butler matrix stages were increased to four, the number of inputs to the adaptive control circuits would amount to twelve, and if the number of matrices were increased to eight, the number of control elements would amount to eight. Of course, the maximum number of controlled discrete nulls in the system is equal to the number of control elements which are adaptively weighted; however, the system still copes with, any number of interfering sources in the same manner as a fully adaptive array with a lesser number of array elements.

I claim:

1. A method of discriminating against interference of a beam space adaptive antenna system having an array of individual antenna elements arranged to form a plurality of sub-arrays, comprising:

processing the signals of a selected number of said elements of at least one sub-array to provide a plurality of first stage signals, one of said first stage signals representing a zero phase shifted sum of the element signals, each of said remaining first stage signals representing the phase shifted sum of the selected individual element signals, combining the signals of the antenna elements of each of the remaining sub-arrays to provide for each of the sub-arrays a single sub-array, processing each of the sub-array signals and the zero phase shift summed first stage signal to provide a plurality of second stage signals, one of said second stage signals being the zero phase shifted sum of the first stage signals, each of said remaining second stage signals representing the phase shifted sum of the sub-array signal, weighting adaptively each of said remaining first and second stage signals, and combining the weighted signals with each other and said zero phase shift summed second stage signal to provide the output signal of the array.

2. A method according to claim 1 wherein the step of processing to provide the first stage signals, comprises, feeding the signal from each of the selected elements of said one sub-array to a respective input port of a first Butler matrix to provide the first stage signal at each of the output ports of said matrix.

3. A method according to claim 1 wherein the step of processing to provide the second stage signals, comprises, feeding the signal from each of the respective subarrays and the zero phase shifted summed frist stage signal to respective input ports of a second Butler matrix to provide the second stage signals at the output ports of the second Butler matrix.

4. A beam space antenna system for discriminating against interference, comprising, a plurality of signal collecting antenna elements arranged to form a plurality of sub-arrays, first processing means coupled to selected ones of the elements of at least one sub-array operative to generate a plurality of first stage signals, at least one of said first stage signals corresponding to a zero phase shifted sum of the collected signals, each of said remaining first stage signal corresponding to the phase shifted sum of the signals collected by the selected ellipses element of said one sub-array, combining means operatively connected to each remaining sub-array to sum the signals collected by each of the elements of its respective sub-array to provide a plurality of sub-array signals, second processing means coupled to each of the sub-array signals and the one first stage signal having the zero phase shifted sum of the collected element signals to form a plurality of second stage signals, each said second stage signal corresponding to the phase shifted sum of the coupled sub-array signals and said zero phase shift summed first stage signal, one of said second stage signals representing the zero phase shifted sum of the first stage signals, and the remaining second stage signals representing the phase shifted sum of the first stage signals, means adaptively weighting each of said first and second stage phase shifted summed signals, and means to combine the weighted signals and the said zero phase shifted summed second stage signal to provide an output signal.

5. A system according to claim 4 wherein the first processing means, comprises a first Butler matrix having a plurality of input ports connected to respective selected antenna elements of said one sub-array to generate the first stage signals at its output ports.

6. A system according to claim 4 or 3 wherein the second processing means, comprises a second Butler matrix having one input port connected to receive said zero phase shifted first stage signal and its other input ports connected to receive respective subarray signals, to generate the second stage signal at each of its output ports.

* * * * *